(12) United States Patent
Fiolka et al.

(10) Patent No.: US 12,158,571 B2
(45) Date of Patent: Dec. 3, 2024

(54) IMAGING SYSTEM AND METHOD TO CONVERT LATERAL SCANNING INTO AXIAL REMOTE FOCUSING

(71) Applicant: THE BOARD OF REGENTS OF THE UNIVERSITY OF TEXAS SYSTEM, Austin, TX (US)

(72) Inventors: Reto P. Fiolka, Dallas, TX (US); Tonmoy Chakraborty, Dallas, TX (US); Bingying Chen, Dallas, TX (US)

(73) Assignee: THE BOARD OF REGENTS OF THE UNIVERSITY OF TEXAS SYSTEM, Austin, TX (US)

( * ) Notice: Subject to any disclaimer, the term of this patent is extended or adjusted under 35 U.S.C. 154(b) by 0 days.

(21) Appl. No.: 17/185,233

(22) Filed: Feb. 25, 2021

(65) Prior Publication Data
US 2021/0263295 A1  Aug. 26, 2021

Related U.S. Application Data

(60) Provisional application No. 62/981,489, filed on Feb. 25, 2020.

(51) Int. Cl.
*G02B 21/06* (2006.01)
*G02B 21/36* (2006.01)
(Continued)

(52) U.S. Cl.
CPC .......... *G02B 21/06* (2013.01); *G02B 21/361* (2013.01); *H04N 23/56* (2023.01); *H04N 23/74* (2023.01)

(58) Field of Classification Search
CPC .... G02B 21/06; G02B 21/361; H04N 5/2256; H04N 5/2354
See application file for complete search history.

(56) References Cited

U.S. PATENT DOCUMENTS 6,268,921 B1 * 7/2001 Seitz ................. G01B 11/2441
356/407
9,823,457 B2 * 11/2017 Li ....................... G02B 21/367
(Continued)

OTHER PUBLICATIONS

International Search Report and Written Opinion for International application No. PCT/US2021/019655, mailed May 24, 2021, 7 pages.

*Primary Examiner* — James T Boylan
(74) *Attorney, Agent, or Firm* — Norton Rose Fulbright US LLP

(57) ABSTRACT

An imaging system configured to transform a lateral scan motion into axial refocusing, thus enabling aberration free remote focusing. In one embodiment, the imaging system provides aberration free remote focusing by causing a beam of light to be scanned over a stationary mirror having a variable height in the scan direction, thereby causing the beam of light to be defocused in an axial direction in the return direction (e.g., the direction of propagation for the reflected beam of light). By configuring the back-reflected light resulting from the lateral scan component as described herein, a pure axial scan motion may be obtained at the rate of the employed (lateral) scanning technology (e.g., a GSM). This capability allows the imaging system of the present inventive concept to leverage rapid lateral scan technologies to produce rapid axial displacement of the axial focus of the beam of light.

11 Claims, 9 Drawing Sheets

(51) Int. Cl.
*H04N 23/56* (2023.01)
*H04N 23/74* (2023.01)

(56) References Cited

U.S. PATENT DOCUMENTS

| | | |
|---|---|---|
| 2002/0094119 A1 | 7/2002 | Sahadevan |
| 2005/0258335 A1* | 11/2005 | Oshiro ................ G02B 21/245 |
| | | 250/201.3 |
| 2007/0078873 A1 | 4/2007 | Avinash et al. |
| 2008/0174785 A1* | 7/2008 | Seitz ................ G01B 11/2441 |
| | | 356/516 |
| 2015/0017210 A1 | 1/2015 | Xie et al. |
| 2016/0327779 A1* | 11/2016 | Hillman ............. G02B 21/0052 |
| 2017/0123196 A1* | 5/2017 | Svoboda ............ G02B 21/0076 |
| 2018/0292321 A1* | 10/2018 | Fiolka ................ G02B 21/367 |
| 2020/0376488 A1* | 12/2020 | Wu .................... G01N 15/1434 |
| 2020/0379231 A1* | 12/2020 | Dohi ..................... G02B 21/06 |
| 2021/0157113 A1* | 5/2021 | Anhut ................ G02B 26/101 |

* cited by examiner

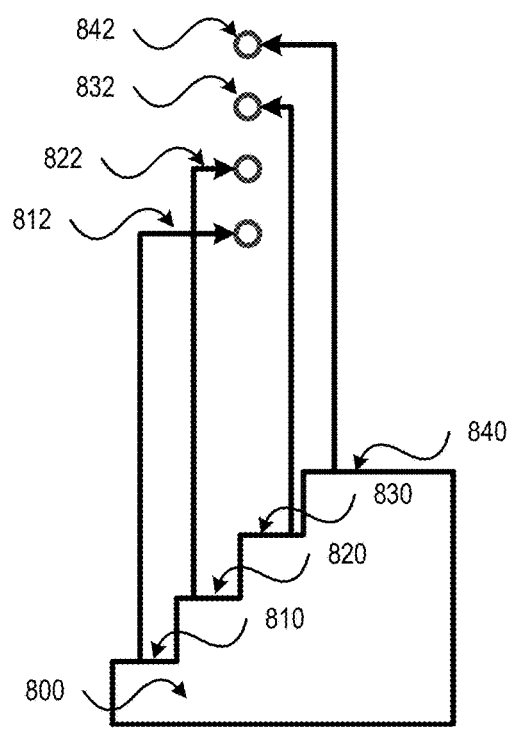
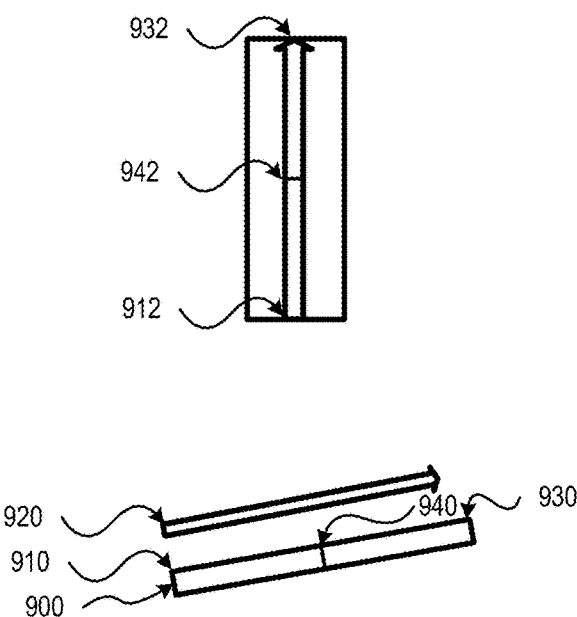
FIG. 8
FIG. 9

IMAGING SYSTEM AND METHOD TO CONVERT LATERAL SCANNING INTO AXIAL REMOTE FOCUSING

CROSS-REFERENCE TO RELATED APPLICATION

This application claims the benefit of U.S. Provisional Patent Application Ser. No. 62/981,489 filed Feb. 25, 2020, the content of which is incorporated by reference in its entirety.

ACKNOWLEDGEMENT OF GOVERNMENT SUPPORT

This invention was made with government support under Grant No. GM133522 awarded by the National Institutes of Health. The government has certain rights in the invention.

BACKGROUND

1. Field

The present inventive concept relates to optical microscopes for three dimensional (3D) volumetric imaging and more particularly to imaging systems enabling aberration free remote focusing.

2. Discussion of Related Art

While optical microscopes used for 3D volumetric imaging have improved over time, they have been traditionally been limited by the slow axial scanning rate of the objective or the sample has traditionally limited the speed of 3D volumetric imaging. Recently, rapid axial scanning has been achieved by conjugating either a movable-mirror to the image plane or an electrotuneable lens (ETL) to the back-focal plane respectively. However, mechanical actuation of a mirror limits axial scanning rate (usually only 10-100 Hz for piezoelectric or voice coil based actuators), while ETLs introduce spherical and higher order aberrations, thereby preventing high-resolution imaging.

The first confocal microscope, as developed by Marvin Minsky, scanned the stage under the focused illumination in order to acquire an image. A major boost for confocal microscopy was realized when mirrors were attached on galvanometers for lateral scanning at orders of magnitude faster rates. To date almost all point scanning microscopes, confocal or multi-photon, still use this basic concept to achieve lateral scanning. Several refinements in scanning technology, such as resonant scanners, acousto-optical deflectors or electro-optics have further improved acquisition speeds to MHz rates. For volumetric imaging, typically a lateral two-dimensional scan is followed by translation of the objective or the sample stage to focus on a different plane. Because of the difficulties associated with mechanically translating heavy components, scanning rates in the third dimension are orders of magnitude slower than the lateral ones, and hence form the bottleneck for rapid volumetric imaging.

A potential way to alleviate this problem is through remote focusing, which is an emerging technique where optical refocusing is carried out without moving the primary objective or the sample. Remote focusing is primarily realized by introducing a wavefront modification either in Fourier space (conjugated to the backfocal plane of the objective) or in image space. The former is achieved using an electro-tunable lenses (ETL) or deformable mirrors, while the latter is achieved by moving a mirror axially in a remote image space. Advances in ETL design have led to hundreds of kHz axial scan rates in resonantly operated devices. However, all ETL designs so far approximate only a quadratic phase function for defocus, which cannot account for higher order spherical aberrations that need to be compensated. While deformable mirrors (DM) are capable of producing more complex wavefronts required for aberration free remote focusing, there are trade-offs between speed and actuator stroke. For example, rapid DMs typically have limited stroke in the range of one wavelength, which in turn limits the achievable axial focusing range. On the other hand DMs with large stroke actuators, thus capable of large focus changes, are typically much slower.

Using a carefully pupil matched remote objective, aberration free remote focusing can be achieved by moving a small mirror in the image space of the remote objective. Depending on the actuation technology, scan speeds from 10-1000 Hz have been reported. However, there is a tradeoff between actuation amplitude and scan rate, and currently no mechanical scan technology exists that could go beyond the fastest reported rates. As such, there is still a need for a high-resolution axial scan technology that has the ability to reach scanning rates comparable to the fastest lateral scan technologies while avoiding the spherical aberrations that currently limit presently available imaging technologies.

SUMMARY

The present inventive concept provides an optical imaging system designed to convert or transform a lateral-scan motion into a spherical-aberration-free, high-resolution, rapid axial scan are disclosed. Using a galvanometric mirror, a beam of light (e.g., a laser beam) may be scanned laterally in a remote-focusing arm of the imaging system. The remote arm of the imaging system may include a mirror configured to reflect the beam of light back from different heights, which produced different depths of focus in a sample to be image. The optical performance of the imaging system may be referred to as a remote focusing technique and may be used to accelerate axially swept light-sheet microscopy (ASLM) by one order of magnitude, allowing the quantification of rapid vesicular dynamics in 3D. The concepts disclosed herein may also be used in raster scanning microscopes (sometimes referred to as laser scanning microscopes) to accelerate the 3D image acquisition speed.

The imaging systems of the present inventive concept are operable to convert or transform a lateral scan motion into axial refocusing, thereby advantageously providing aberration free remote focusing. In one embodiment, the present inventive concept provides an imaging system configured to provide aberration free remote focusing, a beam of light is scanned over a stationary mirror and the height of the mirror varies in the scan direction, which defocuses the beam of light in an axial direction in the return direction (e.g., the direction of propagation for the reflected beam of light). When the back-reflected light resulting from the lateral scan component is configured as described herein, a pure axial scan motion may be obtained at the rate of the employed (lateral) scanning technology (e.g., a Galvanometric Scanning Mirror (GSM)). This capability allows the imaging system to leverage rapid lateral scan technologies to produce rapid axial displacement of the beam of lights axial focus. The scan motion can be resonant or deterministic (i.e. having the ability to freely choose the scanning waveform and to perform discrete scanning steps), depending on the choice of scanning technology. This is in contrast to resonantly driven ETLs, which can only provide sinusoidal waveforms.

Exemplary mirrors that may facilitate the aforementioned rapid axial scans include a step mirror and a tilted planar mirror. Further, instead of refraction from a simple tilted mirror, diffractive optical elements might be used as well, such as a diffraction grating. The step mirror allows arbitrary scan step sizes, but the field of view of the remote scanning system may imposed an upper limit on the number of steps that can be realized. The tilted mirror geometry allows fine axial step sizes that are in principle only limited by the angular resolving power of the lateral scan technology being used. The axial range is tied to the tilt angle and the field of view. Using the diffraction grating, rather than the tilted mirror, may improve the axial range, however the range of wavelengths that can be used with such a system may be reduced. The concepts disclosed herein may be extended to two scan dimensions in the remote focusing arm, allowing additional steps to be added in a second lateral dimension.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention

BRIEF DESCRIPTION OF THE DRAWINGS

For a more complete understanding of the present inventive concept, reference is now made to the following descriptions taken in conjunction with the accompanying drawings, in which:

FIG. 8 is a block diagram illustrating aspects rapid refocusing according to embodiments of the present inventive concept;

FIG. 9 is a block diagram illustrating aspects of rapid refocusing according to embodiments of the present inventive concept;

DETAILED DESCRIPTION

Embodiments of imaging systems configured to provide rapid axial scans of a beam of light per the present inventive concept are described. Two exemplary configurations for facilitating the rapid axial scanning are provided. A first exemplary configuration provides rapid axial scanning in discrete axial steps using a step mirror while a second exemplary configuration provides continuous rapid axial scanning using a tilted mirror. The step mirror configuration allows arbitrarily large axial step sizes over a finite number of steps, while the tilted mirror configuration allows for an arbitrary number and size of axial steps over a more limited scan range. Numerical simulations and experimental measurements of both scan configurations were performed using resonant galvanometric scanning, and the results demonstrate axial focusing at a rate of 12 kHz. The disclosed imaging systems may be leveraged to speed up the framerate of ASLM, thereby enabling this form of high-resolution light-sheet microscopy to image rapid intracellular dynamics. Exemplary aspects of the different configurations of an imaging system according to embodiments of the present inventive concept are described in more detail below with reference to FIGS. 1-6.

Figure 1:
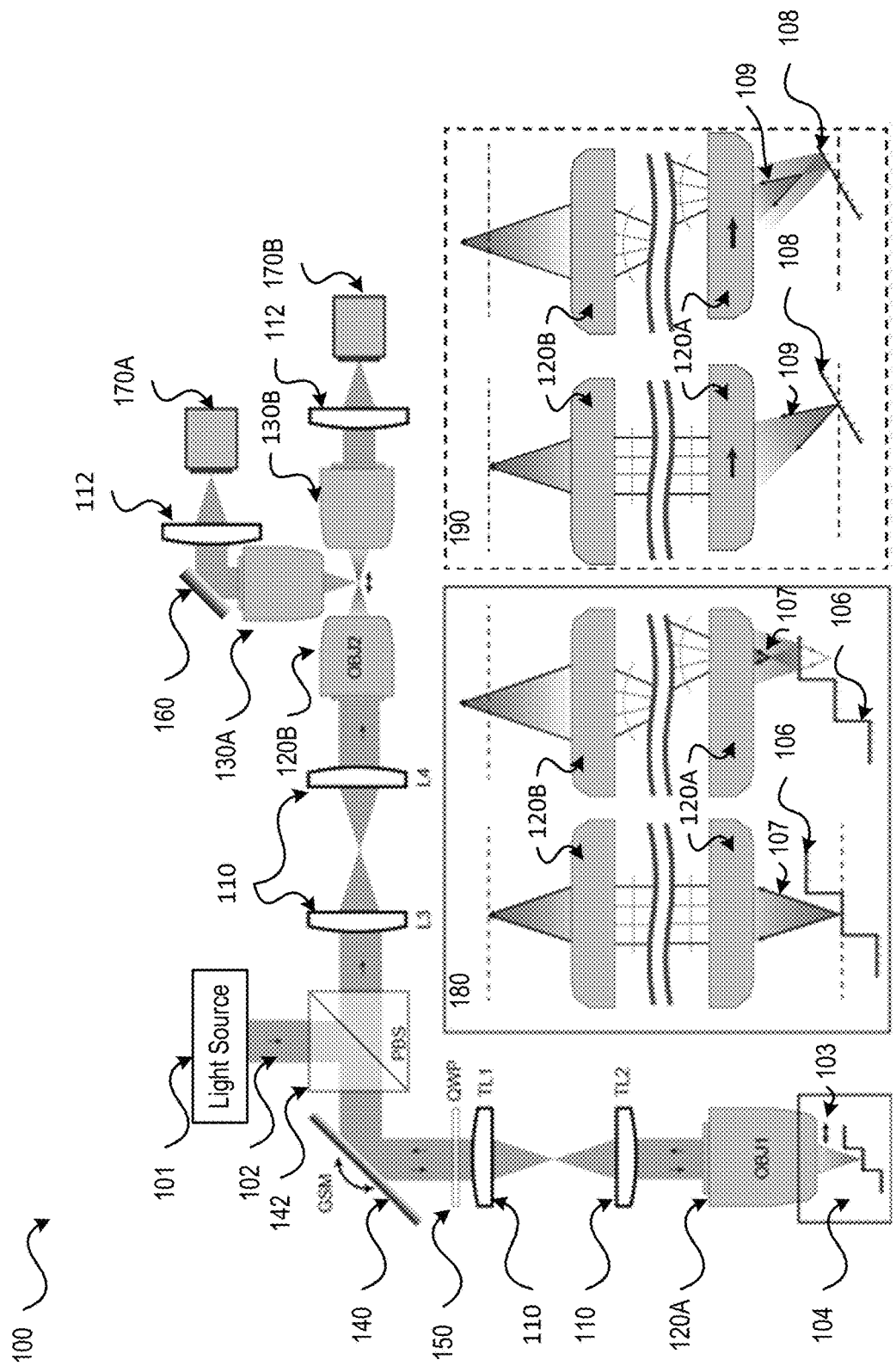
FIG. 1 is a block diagram illustrating an optical imaging device according to embodiments of the present inventive concept.

Referring to FIG. 1, a diagram illustrating a schematic of an optical imaging system according to embodiments of the present inventive concept is shown as an imaging system 100. The imaging system includes a light source 101, a plurality of lenses 110 and 112, a means for remote focusing a beam of light 104, objectives 120A (e.g., an objective designed to illuminate the means for remote focusing a beam of light 104 and receive the reflected light that is transmitted back through the imaging system 100), 120B (e.g., an illumination objective configured to receive reflected light and illuminate a sample to be imaged with the reflected light), detection objectives 130A, 130B, a galvanometric scanning mirror (GSM) 140, a beam splitter (BS) 142, a quarter-wave-plate 150, a mirror 160, and cameras 170A, 170B. As shown in zoomed in views 180, 190, the means for remote focusing a beam of light 104 may be a step mirror 106 (excerpt 180) or may be a mirror 108.

The imaging system 100 may be configured to include two arms oriented at right angles with respect to each other with the GSM 140 at the intersection of the two arms. Various lenses 110 may be provided to image the beam of light through the imaging system 100 to the back focal plane of the objectives 120A, 120B and to image the illumination detected by the objectives 130A, 130B onto the cameras 170A, 170B, respectively. In an embodiment, the objective 120A may be air objective. The objective 120B may be a water objective that is pupil matched to the objective 120A. These two arms of the imaging system may be aligned such that the GSM 140 is conjugated to the backfocal plane of both of the objectives 120A, 120B. Laser foci with different axial position emerging from the objective 120B may be observed with two imaging systems (e.g., the cameras 170A, 170B). One of the imaging systems may be used for direct transmission measurements of the foci and the other imaging system may be used to observe fluorescence in an orthogonal direction. For example, the imaging system utilizing the camera 170A may be used to observe fluorescence (e.g., capture image data based on the illumination of the sample) and the imaging system utilizing the camera 170B may be used for direct transmission measurements of the foci. The objectives 130A, 130B utilized by both imaging systems may be water immersion objectives. The lenses 112 may be tube lenses. In an embodiment, the cameras 170A, 170B may include optical filters suited for the imaging applications for which the imaging system 100 is applied.

In FIG. 1, the objective 120B may be an illumination objective configured to illuminate a sample to be imaged. The objectives 130A, 130B may be detection objectives configured to detect illumination of the sample and to transmit the detected illumination to the cameras 170A, 170B, respectively. It is noted that mirror 160 is provided in order to allow multiple cameras to perform imaging, but that the imaging system 100 may be configured with a different arrangement of cameras and components that enable multiple images to be captured. Further, it is noted that the imaging system 100 may be implemented with less than two cameras. For example, the imaging system 100 could be configured to include the camera 170B but not the camera 170A and in such an arrangement the objective 130A, the mirror 160, the camera 170A, and the lens 110 focusing light diverted from the mirror 160 to the back focal plane of the camera 170A may be removed. Alternatively, a single camera configuration of the imaging system 100 may remove the objective 130B, the camera 170B, and the lens 110 between the objective 130B and the camera 170B and the components facilitating imaging via camera 170A could be retained. Thus, it is to be understood that the configuration of the cameras 170A, 170B and supporting components have been provided for purposes of illustration, rather than by way of limitation and that other configurations and setups for providing detected illumination to one or more cameras may be utilized by embodiments of the present inventive concept.

During operation, the light source 101 may generate a beam of light 102 and the beam of light 102 may be fed into the imaging system 100 by the BS 142 and onto the GSM 140. The beam of light 102 may be a collimated laser beam. The GSM 140 may image the beam of light 102 into the backfocal plane of the objective 120A. Scanning the GSM 140 rasters the focus in one dimension as shown by the double-headed arrow 103. The means for remote focusing a beam of light 104 may be configured to reflect the beam of light 102 with different amounts of defocus back into the objective 120A. The reflections of the beam of light then travels through the system onto the GSM 140. On the way back, the laser light is descanned by the GSM 140 to remove the lateral scan motion so that only the axial component remains. The GSM 140 is then again imaged onto the backfocal plane of the objective 120B, which may be pupil matched with the objective 120A. Because the objectives 120A, 120B are pupil matched, the objective 120B forms an aberration free image of the focus (as formed by the objective 120A) in the sample space (e.g., where the sample to be imaged is located).

As illustrated in zoomed in view 180, in an embodiment, the means for remote focusing a beam of light 104 may be a step mirror 106 and the raster of the beam of light 102 may cause the beam of light to be reflected by different steps of the step mirror 106. For example, in the left hand side of box 180 the beam of light 102 is reflected by the middle step while on the right hand side the beam of light 102 is reflected by the rightmost (relative to the orientation of FIG. 1) step. The left side of zoomed in view 180 shows the focus of the beam of light 102 at its nominal focus and arrows 107 show returning marginal rays after reflection. Each step on the step mirror 106 results in a focus spot in the sample plane with a displaced axial position. To illustrate the leftmost step (relative to the orientation of FIG. 1) may pull the focus towards the step mirror as compared to the nominal focus while the rightmost step (relative to the orientation of FIG. 1) may push the focus beyond the nominal focus. Thus, the different steps of the step mirror 106 reflect the beam of light 102 to different depths of focus, which enables the sample to be illuminated at different depths of focus for imaging by the cameras 170A, 170B. It is noted that although three steps are shown in zoomed in view 180, step mirrors of embodiments may include more than three or less than three steps. Further, it is noted that while the steps illustrated in zoomed in view 180 appear to each have a same step size, the step mirror illustrated in zoomed in view 180 has been provided for purposes of illustration, rather than by way of limitation. As such, it is to be understood that step mirrors utilized in imaging systems according to embodiments of the present inventive concept may include steps that each have a same steps or may include steps having multiple steps sizes (e.g., the step size between a first pair of steps may be X, the step size between a different pair of steps of the same step mirror may be Y, and the step size between another different pair of steps of the same step mirror may be Z, where X, Y, Z are different)

As illustrated in zoomed in view 190, in an embodiment, the means for remote focusing a beam of light 104 may be a tilted mirror 108. The tilted mirror 108 allows continuous axial scanning. The objective 120A is slightly shifted off the optical axis to create a tilted focus that is incident normal to a surface of the mirror 108 and arrows 109 show returning marginal rays after reflection. Scanning this focus laterally results in a change of focus, as illustrated by the black arrows. Stated another way, because the mirror 108 is tilted, as the beam of light passes across the mirror 108 it will be reflected by the mirror 108 at different distances (e.g., in the left hand side of zoomed in view the light is reflected in the middle of the mirror 108 providing a nominal focus and in the right hand side the light is reflected from a position on the mirror that is closer to the objective 120A providing a focus point that is pushed the focus beyond the nominal focus). The beam of light 102 may be scanned across mirror 108 optically by the GSM 140, while the mirror 108 itself remains stationary. However, it is noted that in some embodiments, the mirror 108 may be moved instead, but this may produce a more complicated imaging system setup that may be slower than scanning the beam of light 102 optically over the tilted mirror 108.

Figure 6:
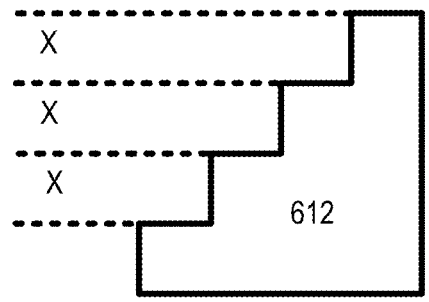
FIG. 6 is a block diagram illustrating aspects of step mirrors according to embodiments of the present inventive concept.
Figure 6:
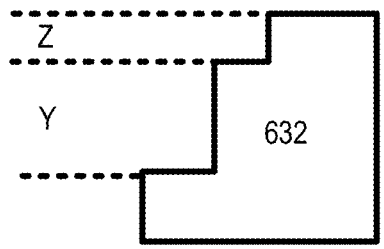
Figure 6:
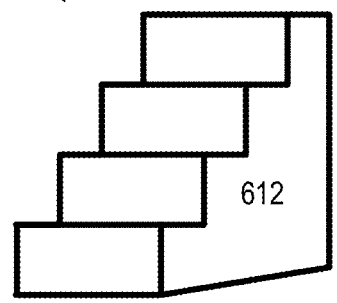
Figure 6:
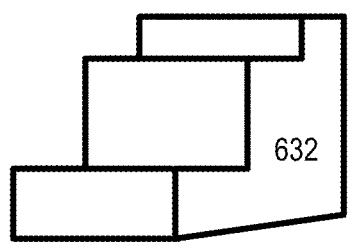
Figure 6:
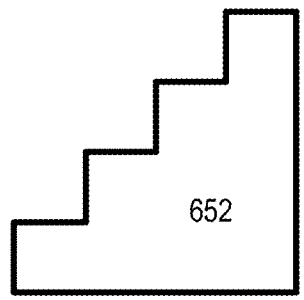
Figure 6:
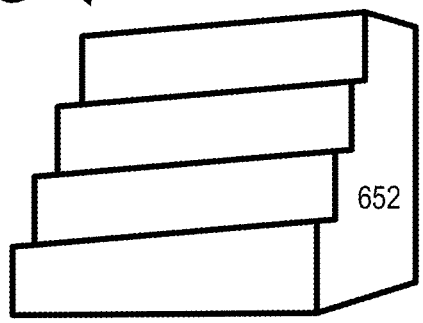

In an embodiment, the means for remote focusing a beam of light 104 may incorporate concepts from both the step mirror 106 and the tilted mirror 108. In such an arrangement, the steps of the step mirror may have angled surfaces similar to the tilted mirror 108, and each step may have a step size that provides a different axial foci as described herein, while each of the angled surfaces of the steps may function to provide continuous scanning at axial foci positions in between the step size increments. Additional aspects of a tilted step mirror are illustrated in FIG. 6.

When a collimated laser beam is reflected by a polarizing beamsplitter into the remote-focusing arm where the beam is scanned by the GSM, it produces a lateral scan motion of the laser focus generated by the objective 120A of FIG. 1. For discrete axial refocusing, a step-mirror may be placed in the focal plane of objective 120A of FIG. 1 (as illustrated in zoomed in region 180 on the left hand side). When the laser spot is incident on a step that is exactly in the focal plane, the back-reflected laser becomes a collimated beam in infinity space and forms a laser spot in the nominal focal plane of the objective 120B. Importantly, as the returning laser beam is de-scanned by GSM 140, no lateral scanning motion is imparted on the focus formed by the objective 120B (i.e., the scan motion is purely axial).

When the laser beam is scanned to a step that does not coincide with the nominal focal plane, a focus of the beam of light away from the focal plane is formed, as shown in the right hand side of zoomed in view 190. The returning beam of light converges or diverges in infinity space which in turn causes the focus of the beam of light formed by objective 120B to be axially refocused as well. For an optical setup where the pupil of the two objectives have been accurately matched refocusing free of spherical aberrations can be achieved. In an experimental setup of the imaging system 100, the image space from the objective 120A, which contains water, was demagnified by a factor 1.33 into the image space of the objective 120B and images free of spherical aberrations were achieved. It is noted that different demagnification factors might be chosen for different immersion media of the objectives 120A, 120B.

One advantage of a means for refocusing a beam of light 104 that includes the tilted mirror 108 is the ability to perform continuous axial refocusing. The step mirror 106 cannot perform continuous axial refocusing because the depth of focus can only be adjusted in discrete increments limited by the step size of the steps, as previously described. The incoming laser focus is also tilted such that it is incident normal to the mirror. As previously described, this tilt may be achieved by slightly translating the objective 120A with respect to the incoming beam of light 102. For a beam position where the laser focus is formed on the mirror surface, a collimated beam is formed in infinity space and a laser spot at the nominal focal plane of objective 120B is formed, as shown in the zoomed in view 190 of FIG. 1 on the left hand side.

When the beam is scanned laterally, a focus away from the mirror plane is formed, as shown in zoomed in view 190 on the right hand side, which in turn causes the beam in infinity space to converge or diverge and leads to an axially displaced focus formed by the objective 120B. It is noted that the tile angle of the tilted mirror may impact the ability to provide a depth of focus that remains spherical-aberration free. For example, testing have shown (both numerically and experimentally) that small tilt angles enable the focusing to remain spherical-aberration free. In the context of the present inventive concept, small tilt angles may include angles between 1 and 10 degrees (e.g., angles between 1 and 2 degrees, angles between 2 and 5 degrees, angles between 4 and 8 degrees, angles between 7 and 10 degrees). It is to be understood that by increasing the tilt angle, and correspondingly offsetting the objective 120A, a lower set of angles provided by objective 120A can be utilized. This in turn will slightly reduce the spatial resolution of the imaging system 100. It is thus envisioned that for highest resolution, an objective 120A with a high angular range (i.e., a high numerical aperture) and a small tilt angle for mirror 108 may be preferable.

To facilitate continuous z-scanning, an angular aperture of the objective 120A may be higher than of the objective 120B, which allows tilting of the laser focus (e.g., the reflected beam of light 102) without giving up any numerical aperture of the objective 120B. The achievable axial scan range scales as an approximation with the field of view (FOV) of the objective 120A times a tangent of the mirror tilt angle. Thus, embodiments utilizing the tilted mirror 108 may benefit from utilization of objectives and scanning systems that possess a large FOV. In contrast, using the step mirror 106, in principle arbitrarily large axial displacements can be realized, with the caveat that for large amounts of defocus, wider steps (e.g., a larger step size between steps) may be needed. This may impose practical limits on how many steps can be used for a given FOV of the objective 120B. Exemplary images demonstrating the aforementioned aspects of the imaging system 100 are illustrated in FIGS. 2-4 and described in more detail below.

Figure 2:
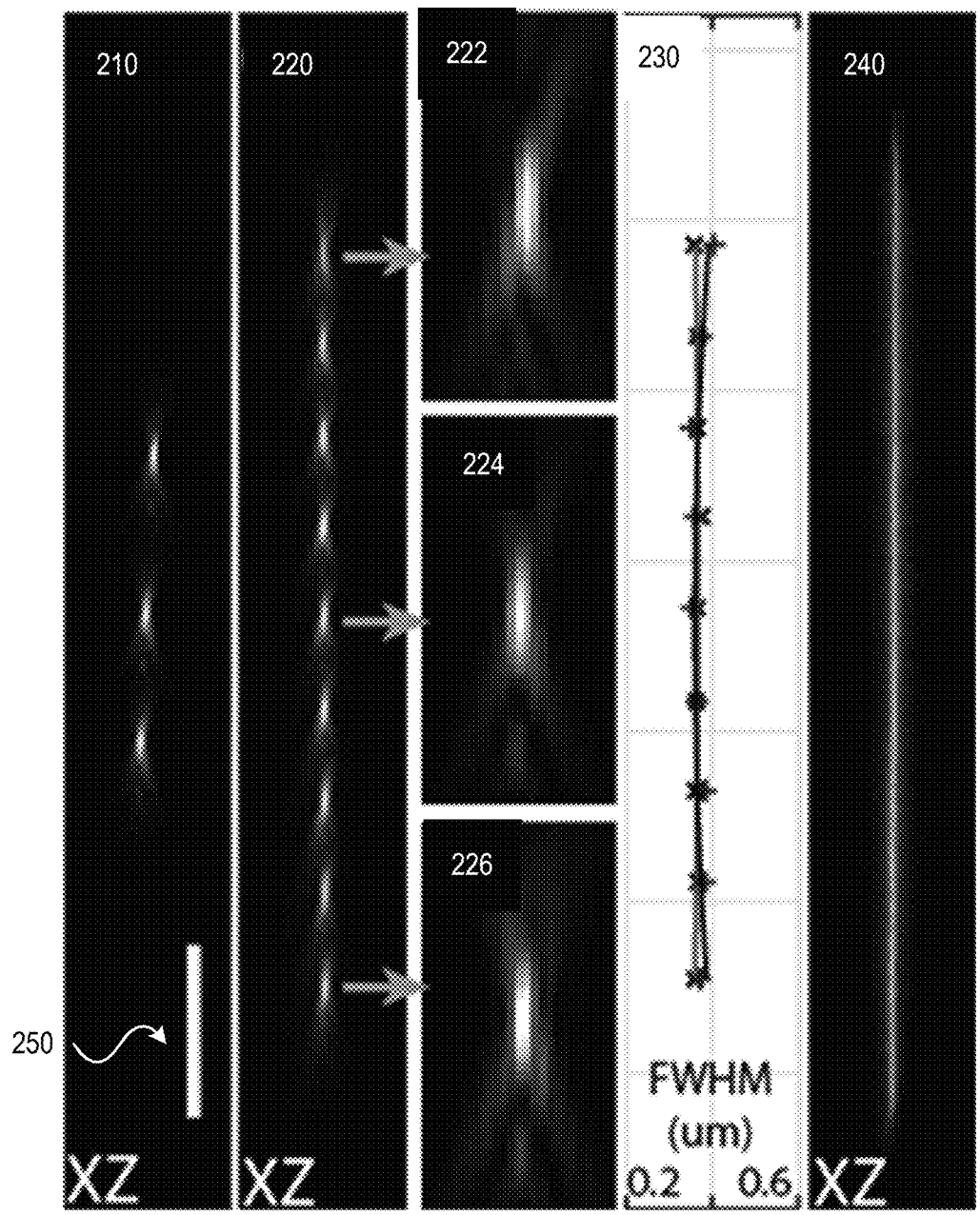
FIG. 2 is a series of images illustrating performance of an imaging system configured in accordance with embodiments of the present inventive concept.

Referring to FIG. 2, images illustrating performance of an imaging system configured in accordance with embodiments of the present inventive concept are shown. In FIG. 2, image 210 illustrates a point spread functions (PSF) obtained using an optical imaging system having a remote mirror (e.g., a mirror similar to the tilted mirror 108 of FIG. 1) with three steps. Image 220 illustrates a PSF realized by a system having a remote mirror inclined at 7.5 degrees with respect to the optical axis. As shown in FIG. 2, the generated PSFs 220 form discrete scanning lateral scanning steps. In FIG. 2, the arrows point to zoomed-in views 222, 224, 226. Image 230 of FIG. 2 shows a plot of the full-width-half-max (FWHM) of the PSFs at different axial focus positions. The FWHM of the PSF calculated in the x dimension is shown in the line curving from left to right and back to the left and the FWHM of the PSF calculated in the y direction is shown in line curving from the right to the left and back to the right. Image 240 illustrates an example of continuous axial scanning obtained by driving the GSM with a triangular waveform at 100 Hz. Scale bar 250 illustrates that a scale for the images 210-240 of 10 um.

Figure 3:
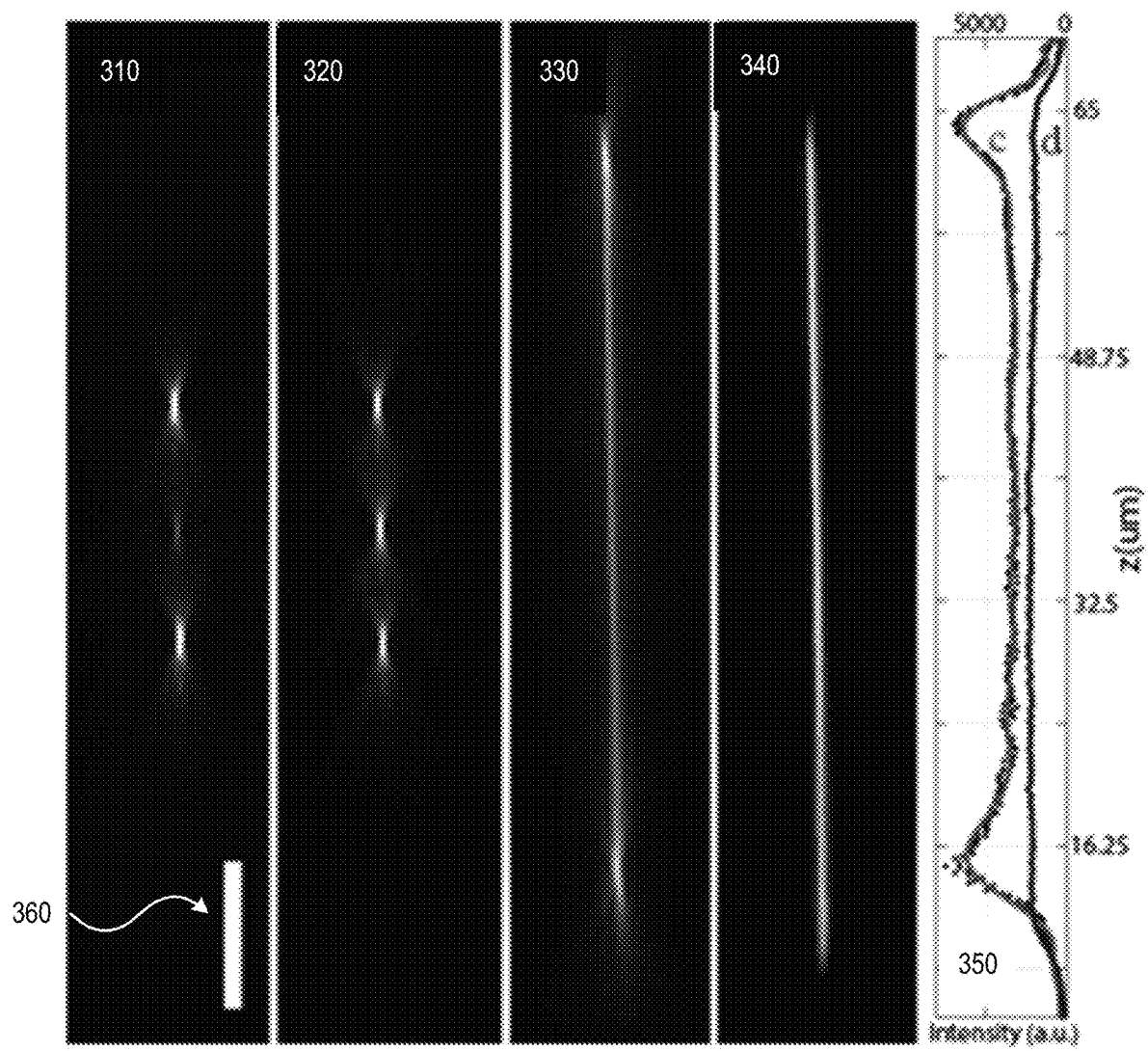
FIG. 3 is a series of images illustrating performance of an imaging system configured in accordance with embodiments of the present inventive concept.
Figure 4:
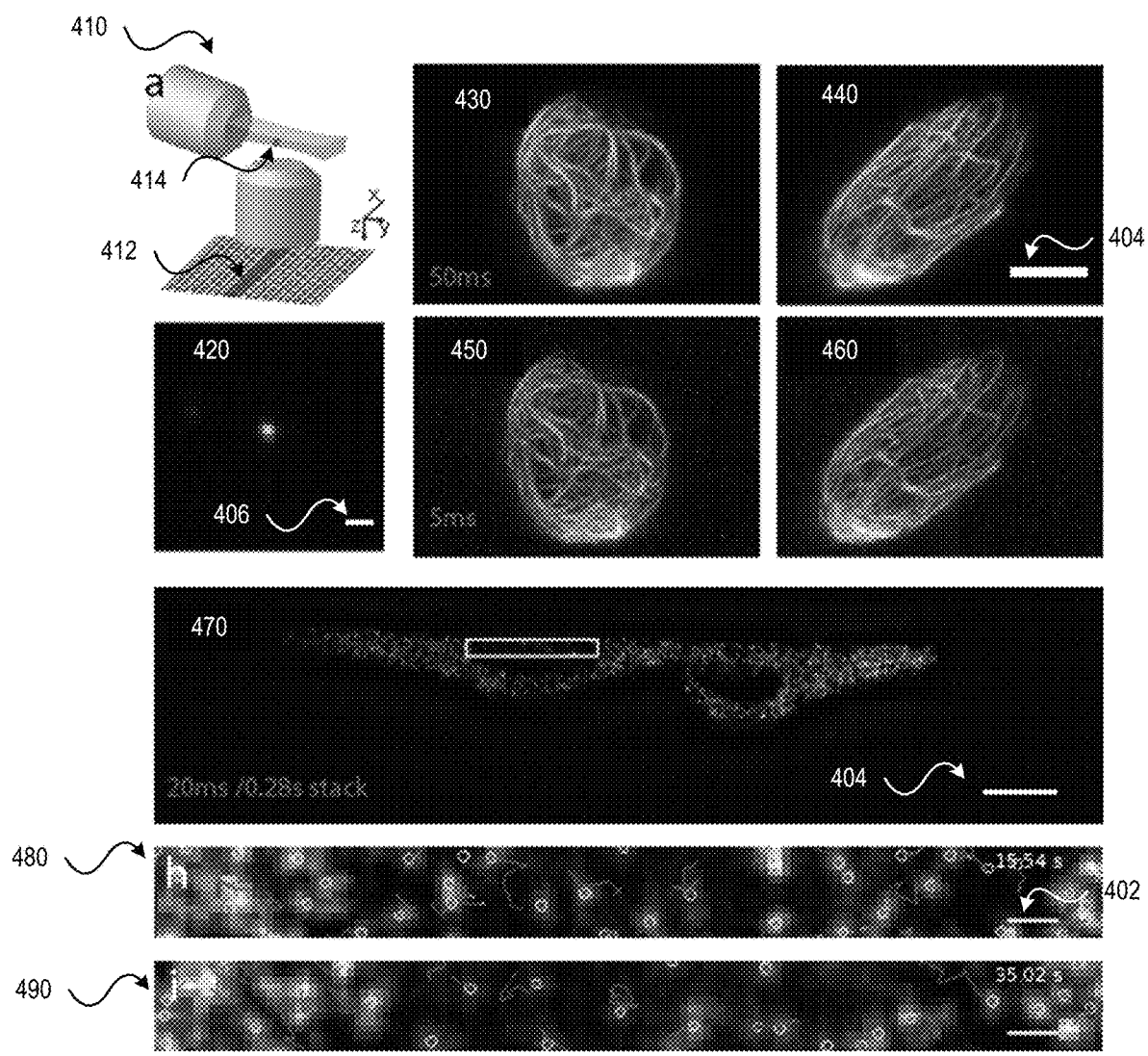
FIG. 4 is a series of images illustrating aspects of volumetric imaging of a sample using an imaging system configured in accordance with embodiments of the present inventive concept.

Referring to FIG. 3, images illustrating performance of an imaging system configured in accordance with embodiments of the present inventive concept are shown. In FIG. 3, image 310 illustrates a PSF obtained using a remote mirror with three steps and a sinusoidal scan motion generated by a resonant galvo mirror driven at 12 kHz. Image 320 illustrates scanning over the same step mirror with a sinusoidal scan motion whose amplitude was adjusted to yield evenly illuminated laser foci. For example, as compared to image 310, the image 320 provides more consistent illumination as can be seen by the more prominent illumination of the middle step in image 320 relative to the middle illumination increment in image 310. Image 330 illustrates the illumination provided by a sinusoidal scan motion over a planar mirror inclined by 7.5 degree with respect to the optical axis. Image 340 illustrates the same arrangement as in image 330, but with a threefold increased scanning amplitude and a mask to truncate the scan range optically, which provides more even illumination. Image 350 is a plot of the illumination intensity illustrated in images 330, 340, with the left hand portion of the plot having the two ridges corresponding to the illumination intensity of the image 330 and the line on the right hand portion of the plot corresponding to the illumination intensity of the image 340.

Figure 10:
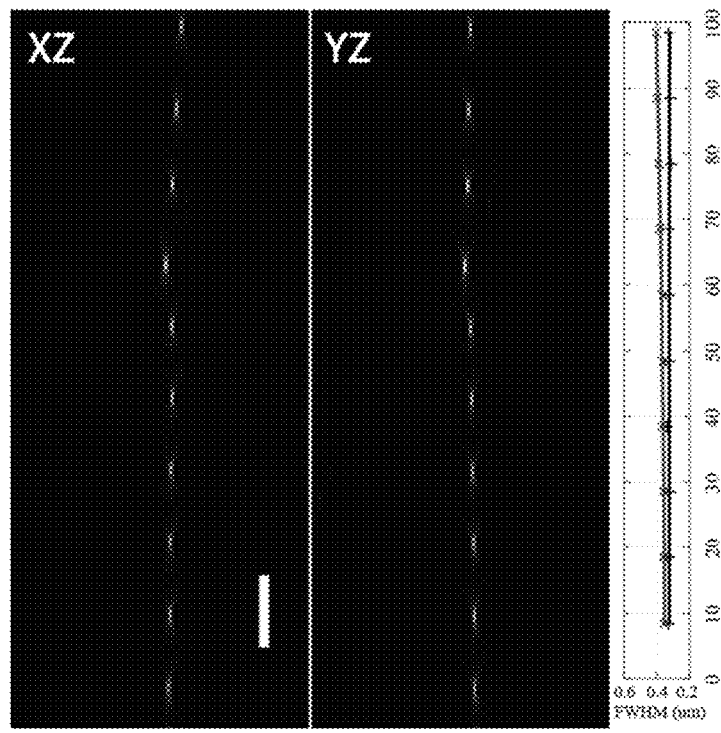
FIG. 10 shows images illustrating remote focusing by translating a planar mirror in the z direction.

An experimental setup consistent with the imaging system 100 illustrated in FIG. 1 was used to measure the PSFs for remote focusing using a mirror with three steps. The mirror was aligned such that the middle step was located in the nominal focal plane of the objective 120A and centered in the middle of the scan range of GSM 140. By positioning the beam of light 102 on each step consecutively, the focus formed by the objective 120B could be translated to three discrete axial positions, which are shown in FIG. 2 at image 210. The optical quality of the foci corresponds closely to conventional remote focusing, i.e. translating the remote mirror mechanically in the axial direction, as shown in FIG. 10, which illustrates remote focusing by translating a planar mirror (e.g., 0 degree tilt) in the z direction.

Figure 11:
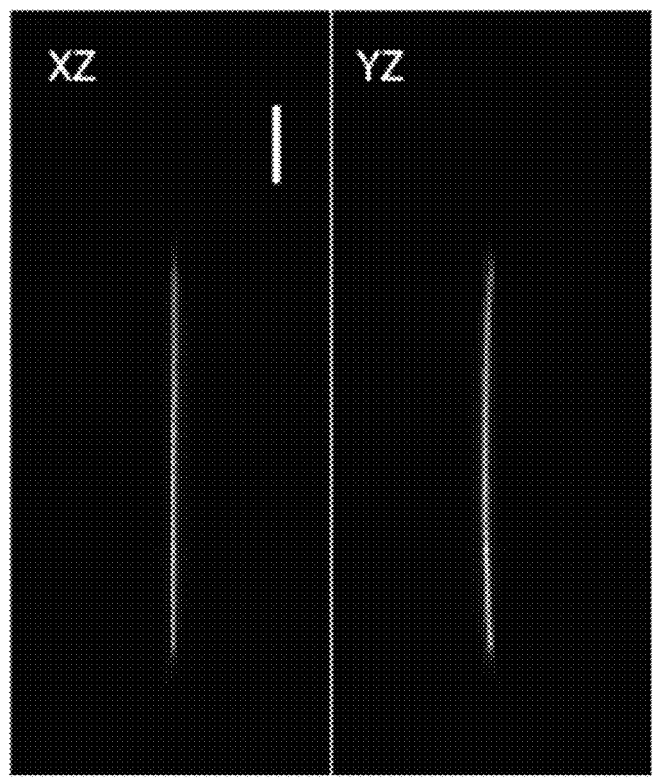
FIG. 11 shows images of continuous axial scanning obtained using a tilt mirror according to embodiments of the present inventive concept.

To test the continuous axial focusing technique, the step mirror 106 was replaced with a planar mirror that was tilted by 7.5 degrees in respect to the image plane to form a tilted mirror and the objective 120A was laterally translated such that the returning beam retraced the same optical path as in the non-titled case. Scanning the beam of light 102 via GSM 140 in discrete steps allowed us to produce a series of axially displaced laser spots that span a range of 43 microns, which are shown in FIG. 2 at image 220. Measuring the full width half maxima confirmed close to diffraction limited performance (364±4.4 nm in x, 371±16 nm in y). Lastly a sawtooth waveform was applied to the GSM 140 and the tilted mirror, which generated a linear axial line scan, shown in FIG. 2 at image 240. The scanned beam of was limited to the FOV of the scan optics (e.g., the objectives 120A, 120B) because notable field curvature starts to become notable once the FOV is exceeded. Scanning beyond the FOV of the scan optics may lead to a slight tilting of the foci at the end of the scan range. This is shown in FIG. 11, which shows XZ and YZ views of continuous axial scanning obtained using a mirror tilt of 7.5 degree by driving the GSM 140 with a triangular waveform at 100 Hz. The YZ view shows the foci bent in the axial scan when the field curvature come into play. In FIG. 11, the scale bar is 10 um. The scan range for the discrete axial foci shown in image 220 of FIG. 2 was performed over a range where field curvature of the lateral scanning system was minimal.

To demonstrate that focusing techniques utilized by the imaging system 100 of FIG. 1 were compatible with faster scan technologies, the GSM 140 was replaced with a 12 kHz resonant galvanometric mirror. When scanned resonantly over the step mirror 106 with a range spanning each of the three steps equally, three axial foci were generated, but the middle axial focus was dimmer than the outer axial foci, as illustrated in image 310 of FIG. 3. This was expected, as the resonant scan spends per cycle less time on the central step than on the outer ones.

By lowering the scan amplitude, the intensity of the three focal spots can be equilibrated, as shown in image 320 of FIG. 3. Balancing the intensity of the three foci is a passive process (i.e. it does not require any laser intensity modulation that is tightly synchronized to the resonant scan motion), which enables imaging systems according to the present inventive concept to be operated in a more simple manner as compared to other types of optical imaging systems (e.g., optical imaging systems that do not have a means for remote focusing a beam of light 104).

When the 12 kHz resonant galvanometric mirror was scanned over a 7.5 degree inclined planar mirror (e.g., the tilted mirror 108 of FIG. 1), the resonant scanner produced an axial line scan with a typical temporally averaged intensity profile for a sinusoidal motion, as shown in image 330 of FIG. 3. The axial intensity distribution can be normalized to provide a more uniform illumination, as shown in image 340 of FIG. 3, which can be accomplished without any synchronized laser modulation. For example, the normalization may be achieved by increasing the scan range of the resonant galvo threefold, such that the approximately linear portion of the sinusoidal oscillation covered the same range. A mask may be placed in the image space between the GSM 140 and the objective 120A to restrict the transmission of the reflected beam of light to a smaller lateral scan range. As lateral and axial scan range are coupled, this essentially allowed the axial scan range to be truncated to a smaller, more homogeneous region, at the expense of temporal duty cycle for the illumination.

Referring to FIG. 4, images illustrating aspects of volumetric imaging of a sample using an imaging system configured in accordance with embodiments of the present inventive concept are shown. The images shown in FIG. 4 demonstrate the usefulness of the scan technology to biological imaging. For example, as shown in image 410, an experimental setup consistent with the imaging system 100 of FIG. 1 was used to perform rapid axially swept light-sheet microscopy. To this end, a cylindrical lens was used to shape the input beam into a light-sheet, which was then imaged into the image space of the objective 120A. Using a planar mirror tilted by 7.5 degrees, a thin lightsheet (effective NA 0.8) was scanned over an approximately 40 micron range. Image 410 illustrates a schematic principle of axially swept light-sheet microscopy (ALSM), where a thin light-sheet was scanned in its propagation direction and only the region within the beam waist (e.g., bars 412, 414) was readout by an sCMOS camera. The PSF for this scan is shown in FIG. 4 at image 420, which demonstrates the imaging system provided ASLM capabilities that achieve slightly sub 400 nm axial raw resolution, which is in accordance with previous systems. RPE cells labeled with vimentin-GFP were imaged at both 50 ms and 5 ms exposure time.

Image 420 illustrates the resulting PSF in an x-z view. Images 430, 440 are images of an RPE cell labeled with GFP vimentin, imaged at 50 ms framerate, with image 430 corresponding to an x-z maximum intensity projection and image 440 corresponding to a y-z maximum intensity projection. The same cell imaged with ASLM at 5 ms framerate is shown in images 450, 460, with image 450 corresponding to an x-z maximum intensity projection and image 460 corresponding to a y-z maximum intensity projection. Image 470 shows genetically encoded multimeric nanoparticles (GEM) inside two RPE cells, imaged using ASLM at 20 ms framerate and 0.28 s volume rate. Images 480, 490 illustrate an axial y-z view of the perinuclear region at two timepoints. The circles visible in the images 480, 490 indicate detected vesicles and while the lines visible in the images 480, 490 illustrate cumulative tracks. Scale bar 402 represents 1 um and scale bar 404 represents 10 um, and scale bar 406 is 1 um. Previously, ASLM could only be performed at an exposure time of 100-200 ms. The images illustrated in FIG. 4 demonstrate that the imaging systems disclosed herein operate to speed up the exposure time by a factor 20-40× while still providing the same level of spatial resolution as previous ASLM techniques. For example, as can be seen in images 430, 440, 450, 460, the morphological detail is faithfully recovered for the 50 ms exposure time (e.g., images 430, 440) and similarly recovered for the tenfold faster 5 ms acquisition time (e.g., images 450, 460).

To leverage this rapid ASLM system, genetically encoded multimeric nanoparticles (GEM) inside RPE cells were imaged. Such imaging has previously only been performed two dimensionally due to restriction in volumetric acquisition speed. However, as shown in images 480, 490, the experimental imaging system was able to acquire volumetric data at a rate of 3.5 Hz and isotropic sub 400 nm resolution, which was sufficient to track GEMs in the perinuclear region of the cells in 3D space.

While the scan range used in the experimental setups previously described was limited to around 40 microns, this was mainly caused by the small FOV of the objective 120A, which was 350 microns. Lenses of similar NA with much larger field numbers and corresponding tube lenses for wide fields (26 mm) have become available that should increase the scan range four-fold, enabling scan ranges approaching or exceeding 160 microns. A two dimensional lateral scan with a mirror that is tilted in one dimension and has discrete steps in the other dimension (e.g., the surfaces of the steps are tilted) could also be used to improve scan range while keeping the ability for continuous scanning. The aforementioned imaging system configurations allow an order of magnitude acceleration over previous imaging systems while keeping the high spatial resolving power of this emerging imaging technology.

Another application area where the disclosed imaging systems may be utilized is multiphoton raster scanning microscopy, which is the backbone in fluorescence imaging in the neurosciences. Here, both the discrete and the continuous scan technology presented herein may find many applications to image different layers of the brain nearly simultaneously or to rapidly acquire whole volumes to measure neuronal firing patterns. To build a 3D raster scanning microscope, the remote focusing system may be combined with a lateral scanning unit, which would be disposed downstream from the means for remote focusing a beam of light 104 of FIG. 1. Thus, the imaging systems of embodiments, and the benefits that the disclosed imaging systems provide, may be readily utilized in widespread applications to accelerate microscopic 3D imaging in biology and the life sciences.

EXPERIMENTAL SETUP

In the aforementioned experimental setup, the beam of light (e.g., the beam of light 102 of FIG. 1) was a laser light generated by a solid state diode pumped CW laser at 488 nm wavelength (Coherent Sapphire) and was cleaned up by a pinhole and expanded 5-fold. A halfwave plate was used to rotate the polarization of the beam to vary the laser power entering the remote focusing arm (e.g., the portion of the imaging system 100 including the means for remote focusing a beam of light 104 and the objective 120A).

The remote focusing arm included a 60×0.7NA air objective (Nikon), two f=200 mm telecentric tube lenses (AC508-200-A, ThorLabs), a quarter-wave-plate QWP, (Newport) and a Galvo scanner (CRS12 kHz, Cambridge Technologies). As this air objectives requires a coverslip, a 170 micrometer thick coverslip was glued to the front surface of the objective 120A (e.g., a lens of the objective 120A that is proximate the means for remote focusing a beam of light 104). It is noted that the coverslip being glued to the front surface of the objective 120A may not be required in all implementations and was included in the experimental setup due to the specific components used to construct the imaging system used to verify the concepts disclosed herein. Thus, it is to be understood that such a coverslip is not required in all implementations of an imaging system according to embodiments of the present inventive concept. The illumination arm included a 40×NA 0.8 water dipping objective (Nikon), and two achromatic doublets (AC508-150-A and AC508-300-A, ThorLabs)). A custom made sample chamber was used into which the water dipping lens was immersed. The relay lenses were chosen such that the overall demagnification from the remote mirror (e.g., the means for remote focusing a beam of light 104) to the water chamber corresponds to 1.333.

Each of the two imaging arms included a 40×NA 0.8 water dipping objective (Nikon), a f=200 mm telecentric tube lenses and an Orca Flash 4 camera. Neutral density filters were used to attenuate the laser light in direct transmission. For the fluorescence detection, a longpass filter (Semrock) was used to block the laser light spurious reflected laser light and allow only fluorescence light to pass (e.g., to the cameras 170A, 170B).

For the direct transmission imaging arm, an objective piezo (PIFOC, Physik Instrumente) was used to acquire 3D stacks of the laser spots using z-stepping of the objective (i.e. the tertiary objective corresponding to the imaging arm). For the fluorescence detection arm, no provisions for z-stepping of the objectives were made. To acquire 3D volumes in ASLM, the sample was scanned with a Piezo stage (Hera, Physik).

The micro step mirror (e.g., the step mirror 106) was fabricated using UV-lithography. Initially, 5 μm of SU-8 3005 was spin coated (Laurell, WS-650MZ-23NPPB) at 3000 rpm onto a 3 inch silicon wafer. The wafer was then soft baked and treated according to the protocol of the photoresist distributor (Microchem). A microfluidic mask (showing a rectangular pattern/an edge) was projected for 20 seconds onto the wafer. The wafer was post-baked at 95° C. so that the interfaces between developed and undeveloped regions become visible. Afterwards the wafer was spin-coated again with 5 μm SU-3005 using the same procedure as previously described. The wafer was exposed to the same mask a second time, but this time rotated and translated by a few mms in one direction in comparison to the former exposure. In this manner, a micro-staircase with a continuous varying step width—ranging from mms to microns—over a wide region of the wafer was fabricated. The whole wafer was again baked at 95° C. and finally rinsed with PGMEA and IPA. At last the wafer was covered with a layer of 100 nm platinum to make the surface reflective using a sputter coater (Quorum Technologies Q150T ES Turbo-Pumped Sputter Coater/Carbon Coater). A profilometer (BRUKER, DektakXT) was used to measure the height of the steps and optimize the procedure.

Figure 5:
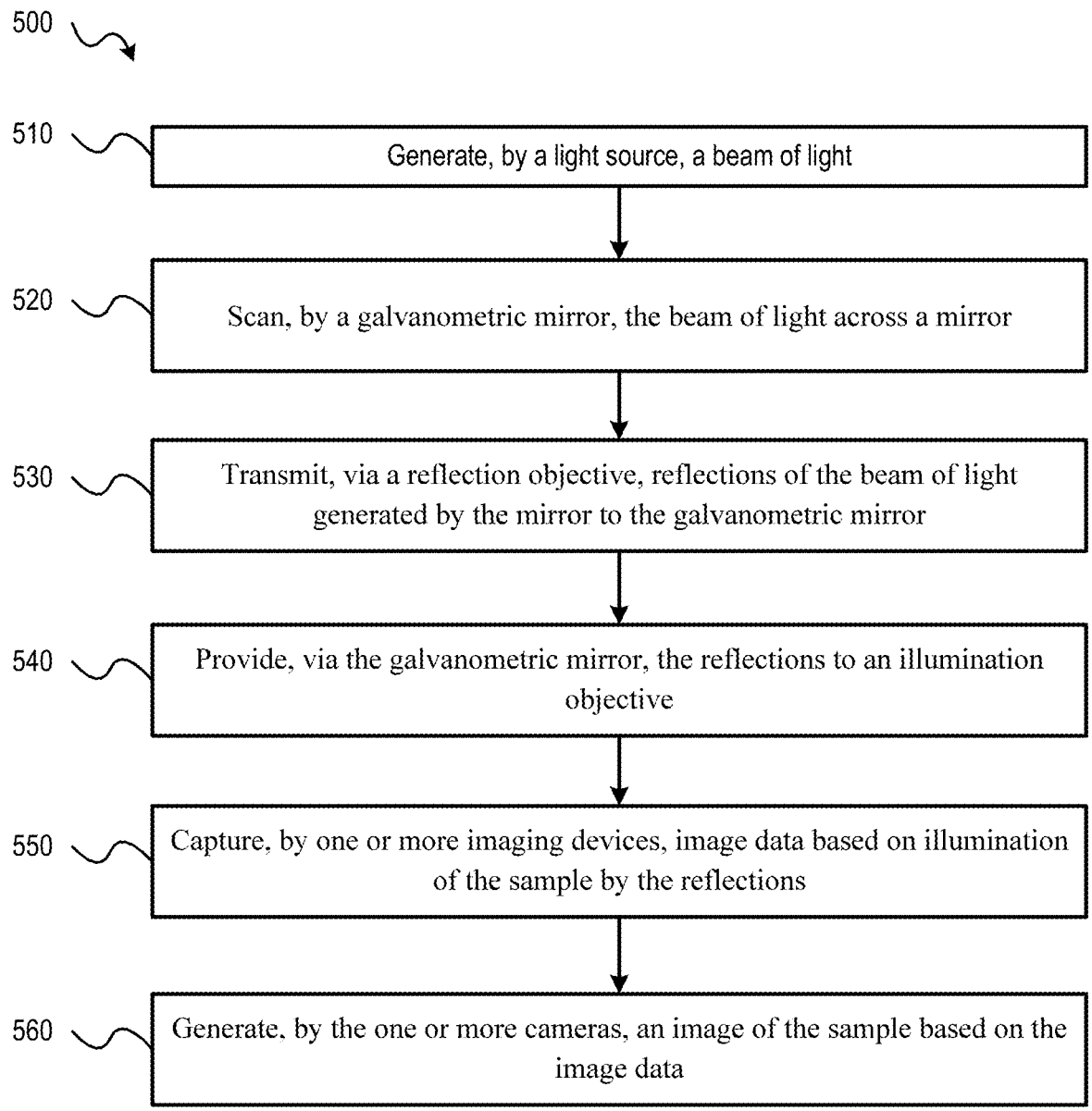
FIG. 5 is a flow diagram of a method for providing rapid aberration free remote focusing in accordance with embodiments of the present inventive concept.

Referring to FIG. 5, a flow diagram of a method for providing rapid aberration free remote focusing in accordance with embodiments of the present inventive concept is shown as a method 500. In an embodiment, the method 500 may be performed by a system, such as the imaging system 100 of FIG. 1. In an embodiment, the method 500 may be performed under the control of one or more processors of a computing device, such as a server, a laptop computing device, a desktop computing device, a smartphone, and the like. For example, the steps of the method may be stored as instructions that, when executed by one or more processors, control components of an imaging system to perform the method 500.

At step 510, the method 500 includes generating, by a light source, a beam of light. In an aspect, the beam of light may be generated by the light source 101 of FIG. 1. At step 520, the method 500 includes scanning, by a galvanometric mirror, the beam of light across a mirror. As previously described with reference to FIG. 1, the mirror may be configured to provide different axial foci during the scanning. In particular, the mirror may be the step mirror 106 or the tilted mirror 108 of FIG. 1, which are configured to generated reflections of the beam of light from different positions (e.g., different steps of the step mirror 106 or different locations along the tilted surface of the tilted mirror 108).

As explained with reference to FIG. 1, each of the different locations on the surface of the mirror may provide a different axial focus. Where a step mirror is utilized, the step mirror may include a plurality of reflective steps. In an embodiment, the plurality of reflective steps may include at least 3 reflective steps. Each of the reflective steps of the plurality of reflective steps may have a same step size (e.g., each step is a step size of X) or different step sizes (e.g., a step size associated with a first step may be X and a step size associated with a second step may be Y, where X≠Y). In an embodiment, the plurality of reflective steps of the step mirror may have tilted surfaces. At least one tilted surface of the plurality of reflective steps may have an angle of approximately 7.5 degrees. Where a tilted mirror is utilized, the tilted mirror may have a tilt angle of approximately 7.5 degrees. In an additional or alterative aspect, the tilt mirror may have a tilt angle of less than 9 degrees. In an additional or alterative aspect, the tilt mirror may have a tilt angle greater than 5 degrees. In an additional or alterative aspect, the tilt mirror may have a tilt angle between 5 degrees and 9 degrees.

At step 530, the method 500 includes transmitting, via a first objective, reflections of the beam of light generated by the mirror to the galvanometric mirror. As previously discussed, the beam of light may pass through the first objective (e.g., the objective 120A of FIG. 1) prior to being reflected by the mirror and then pass back through the first objective on its way back to the galvanometric mirror. It is noted that one or more intermediate components may be disposed within the path between the galvanometric mirror and the first objective, such as the lenses and QWP illustrated in FIG. 1. At step 540, the method 500 includes providing, via the galvanometric mirror, the reflections to an illumination objective. The illumination objective may be the objective 120B of FIG. 1 and may be configured to illuminate a sample to be imaged using the reflections, as previously described with reference to FIGS. 1-4.

At step 550, the method 500 includes capturing, by one or more imaging devices, image data based on illumination of the sample by the reflections. For example, as the sample is illuminated by the reflections, fluorescence light caused by the illumination may be detected by a detection objective (e.g., the object 130A of FIG. 1) and the illumination may be provided to the imaging device (e.g., the camera 170A of FIG. 1). At step 560, the method 500 includes generating, by the one or more cameras, an image of the sample based on the image data. In an embodiment, the imaging device may record the image data to a memory and one or more processors may generate the image of the sample based on the captured image data. In an aspect, the method 500 may include measuring, by a second imaging device, a focus of each of the reflections, as previously described with reference to FIGS. 1-4.

Referring to FIG. 6, a block diagram illustrating aspects of step mirrors according to embodiments of the present inventive concept are shown. In FIG. 6, profile view 610 illustrates a side surface 612 of step mirror having 4 steps, each having a step size of "X" is shown. A perspective view 620 of the step mirror corresponding to profile view 610 is shown and illustrates that each step has a non-tilted surface. Profile view 630 illustrates side surface 632 of a step mirror having 3 steps and two different step sizes (e.g., step sizes Y, Z, where Y, Z are different). It is noted that although step mirror illustrated by profile view 630 and perspective view 640 illustrates three steps and two different step sizes, step mirrors according to the present inventive concept may be configured with more than three steps and more than two different step sizes depending on the particular applications to which the step mirror may be applied. Profile view 650 illustrates a side surface 652 of a tilted step mirror having 4 steps and perspective view 660 of the tilted step mirror shown by profile view 650. As shown in FIG. 6, the profile of each step of the tilted step mirror may form a 90 degree angle when viewed in the profile view 630, but the span of each step may be tilted as shown in the perspective view 660. It is noted that the tilted step mirror illustrated by profile view 650 and perspective view 660 may be utilized as a step mirror only, such as by scanning the beam of light to one spot on each step, or as a tilted mirror only by scanning the beam of light across only one step surface, or may be utilized as both a step and tilted mirror. The step mirror illustrated by profile view 650 and perspective view 660 enables a larger scan range with fine steps to be realized. To illustrate, the step mirrors corresponding to view 610, 620, 630, 640 may be able to provide a scan range that is limited to the number of steps, with one scan per step (e.g., scanning at different portions of the span at each step will not alter the depth of the axial foci because the surface of each step is flat across the span). In contrast, the tilted step mirror corresponding to views 650, 660 may provide a per step scan similar to the per step scan provided the step mirror illustrated in view 610, 620, 630, 640, and may also be able to provide additional scans per step due to the tilted surface across the span of each step. Stated another way, the tilted surface of each step may operate to provide a continuous scan similar to the tilt mirror, as previously described with reference to FIG. 2 at image 240. Additionally, while any single tilted surface of a step may operate in a manner similar to a single tilted mirror, the different steps and their corresponding tilted surfaces may operate to provide additional depths for the axial foci, as each step is essentially a tilted mirror (e.g., a tilted mirror 108) having a different depth of axial focus relative to the other steps (e.g., due to the difference in step size). It is noted that tilted step mirrors, such as tilted step mirror illustrated by profile view 650 and perspective view 660 may also be configured to include different step sizes, similar to the step mirror in view 620. It is further noted that to fully leverage the tilted step mirror shown in views 650, 660, a two dimensional raster scan should be performed, either by using two GSMs (e.g., two GSMs 140) in series (e.g., a first GSM to scan in a first direction, such as to each of the different steps) and a second GSM to scan in a second direction, such as across the tilted surface of the span of each step), or by using one GSM (e.g., GSM 140 of FIG. 1) and mechanically translating the tilted step mirror in one dimension (e.g., using the GSM to scan to each step surface and then mechanically translating the tilted step mirror such that the scan travels across the surface of a current step or using the GSM to scan across the surface of a current step and then mechanically translating the tilted step mirror to situate a next scan on a different step).

Figure 7:
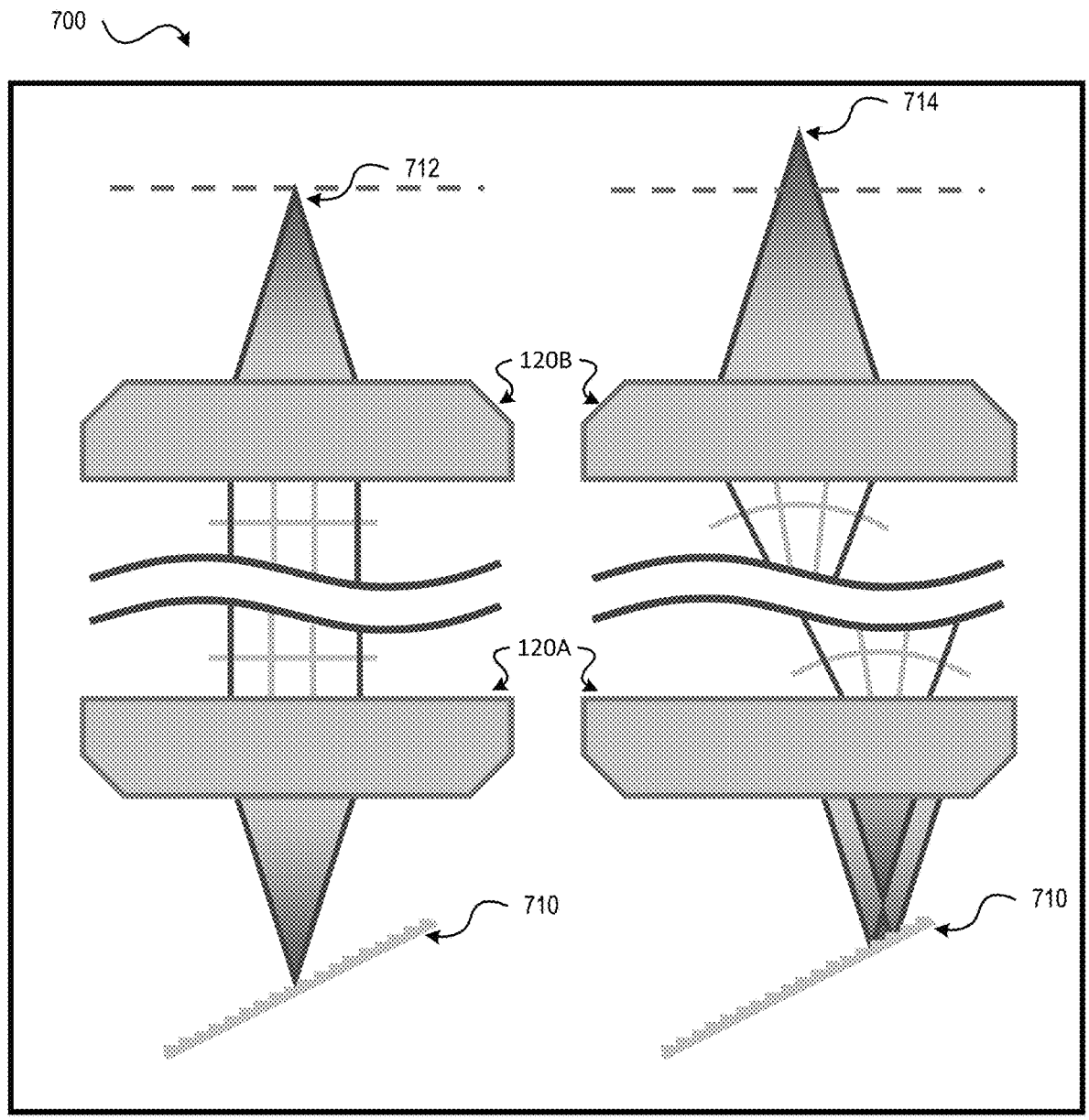
FIG. 7 is a diagram illustrating additional aspects of an imaging system according to embodiments of the present inventive concept.

Referring to FIG. 7, a diagram illustrating additional aspects of an imaging system according to embodiments of the present inventive concept is shown as an imaging system 700. In FIG. 7, the imaging system 700 is shown as including the objectives 120A, 120B of FIG. 1 are shown. It is noted that other portions of the imaging system 700 may include the components similar to the imaging system 100 of FIG. 1, such as the detection objectives 130A, 130B, the cameras 170A, 170B, the lenses 110, the GSM 140, the light source 101, etc., which are not shown in FIG. 7 to simplify the differences between the imaging system 100 and the imaging system 700.

The imaging system 700 further includes a diffraction grating 710. The diffraction grating 710 may operate on principles similar to the tilted mirror 108 of FIG. 1, but may be configured such that the dominantly diffracted light (e.g., the reflected light) goes back through the imaging system (e.g., towards the sample to be imaged) exactly the way it came in. A diffraction grating may be an optical component with a periodic structure that splits and diffracts light into several beams travelling in different directions. These different directions are called diffraction orders. The diffraction grating 710 may be designed to diffract most light into one specific order, typically the first order. For example, as shown on the left hand side of FIG. 7, when the light is reflected by a step proximate the middle of the diffraction grating 710, the reflection may have a nominal depth of focus 712, and when the light is reflected by a step towards the portion of the diffraction grating closer to the objective 120A, the depth of focus may be pushed away from the nominal depth of focus 712, as shown on the right hand side of FIG. 7. It is noted that were the light to be reflected by a step on the portion of the diffraction grating 710 to the left of the step providing the nominal depth of focus (e.g., a step further away from the objective 120A than the step providing the nominal depth of focus 712), the resulting depth of focus upon exiting the objective 120B would be pulled towards the objective 120B (e.g., a shallower depth of focus). Thus, in contrast to the tilted mirror 108, the input beam of light does not need to be tilted when the diffraction grating 710 is used.

As shown in FIG. 7, the diffraction grating 710 may be constructed similar to a step mirror (e.g., the step mirror 106 of FIG. 1), but may include a greater number of steps. The series of steps of the diffraction grating 710 may be situated along an inclined angle between 10-30 degrees. The series of steps of the diffraction grating have a uniform step size and may be substantially flat along the span of the steps, similar to the step mirror illustrated in profile view 610 and perspective view 620 of FIG. 6, but having a greater number of steps overall. As the imaging system shown in FIG. 7 is based on diffraction, the individual elements do not need to be shaped like steps and other forms of gratings are also possible (e.g., round grooves), as long as the structure is periodic. These different structures may exhibit different diffraction efficiencies with which they reflect the light back into objective 120A. Using the diffraction grating provides a greater range than could be achieved with a tilted mirror (e.g., tilted mirror 108 of FIG. 1) alone, which may only be able to be tilted up to 10 degrees. The tilt mirror setup forms a trade-off, where more tilt gives more scan range, but at the same time limits the angular range that can be used on the objective, which in turn lowers the resolution of the overall system (e.g., higher angles mean finer details can be imaged). An imaging system based on the diffraction grating 710 does not face this drawback, as the full angular range can be used (i.e., the incoming and outgoing beam does not need to be tilted, which means the full angular range of the objective can be used). For example, the imaging system 700 may realize a scan range that is 2-3 times the scan range that could be achieved by a tilted mirror alone while maintaining a simple imaging system design. However, it is noted that the diffraction grating 710 may produce satisfactory results on a more limited set of wavelengths as compared to the tilted mirror setup, which works for any wavelength. Thus, imaging systems incorporating the diffraction grating 710 may be suitable for many use cases where a single wavelength, rapid focusing system is desired. There are two-photon raster scanning microscopes that are essentially running on one single wavelength, as their ultrafast laser sources cannot be tuned to different wavelengths. If such microscopes have a tunable light-source, this tuning is typically slow (in the order of seconds). In this timespan, the imaging system 700 may be reconfigured such that a different diffraction grating 710, optimized for the new wavelength, could be inserted into the imaging system. Accordingly, imaging systems incorporating diffraction gratings according to embodiments of the present inventive concept provide a viable alternative to such setups and may provide better performance due to the rapid refocusing capabilities of the imaging systems disclosed herein.

Referring to FIG. 8, a block diagram illustrating aspects rapid refocusing according to embodiments of the present application is shown. In FIG. 8, a step mirror 800 is shown including 4 steps 810, 820, 830, 840, and each of the steps provides a different depth of focus. To illustrate, step 810 provides depth of focus 812, step 820 provides a depth of focus 822, step 830 provides a depth of focus 832, and step 840 provides a depth of focus 842. Thus, it can be seen that rapid refocusing of the light may be achieved by rapidly scanning a beam of light across each step. However, the remote focused light provided by each of the depths of focus 812, 822, 832, 842 is limited to the step size of the steps and cannot achieve remote focusing in between the incremental step sizes.

Referring to FIG. 9, a block diagram illustrating aspects of rapid refocusing according to embodiments of the present application is shown. In FIG. 9, a tilt mirror 900 includes a first end 910, a second end 930, and a midpoint 940. As a beam of light 920 is scanned across the tilt mirror 900, a continuous rapid refocusing of the reflected light may be achieved. For example, as the beam of light 920 is scanned across the surface of the tilt mirror 900, light reflected by the first end 910 may provide a depth of focus 912. The depth of focus may continuously change until the beam of light is reflected near the second end 930, which provides a depth of focus 932. A nominal depth of focus 942 may be achieved when the beam of light 920 is scanned across the midpoint 940 of the tilt mirror 900.

It is noted that the tilted step mirror may result in a combination of the depth of focus aspects illustrated in FIGS. 8 and 9. For example, while the tilt mirror 900 of FIG. 9 provides a continuously changing depth of focus, the change in the depth of focus that may be realized as the beam of light is scanned across the tilt mirror 900 may only be a depth similar to the difference between two of the steps shown in FIG. 8. For example, the depth of focus 912 of FIG. 9 may be similar to the depth of focus 812 of FIG. 8 and the depth of focus 932 may be similar to the depth of focus 822 of FIG. 8. It is to be appreciated that with such a configuration, the tilted step mirror may provide a greater range for rapid refocusing, such as to provide continuous refocusing across each of the gaps present in FIG. 8 (e.g., a first tilted step may provide continuous refocusing between the range indicated by the depths of focus 812, 822; a second tilted step may provide continuous refocusing between the range indicated by the depths of focus 822, 832; a third tilted step may provide continuous refocusing between the range indicated by the depths of focus 832, 842, and the fourth tilted step may provide continuous refocusing beyond the range indicated by the depths of focus 842).

From the foregoing, it has been shown that the imaging system 100 of embodiments provides improvements to imaging systems that utilize ASLM techniques and enable rapid scanning of axial foci. Further, it is noted that although particular advantages and improvements have been described, one of ordinary skill may readily recognize additional advantages provided by the configuration and operations of the imaging system 100 of FIG. 1. Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An imaging system comprising:
   a light source configured to generate a beam of light;
   a first mirror configured to scan the beam of light across a second mirror so the beam of light passes through an objective and is reflected by the second mirror during the scan to yield reflections of the beam of light that pass through the objective prior to returning to the first mirror, the second mirror including a tilted planar mirror having a unified structure including a first portion and a second portion, the first portion and the second portion each being planar; the first portion configured to reflect the beam of light at a different distance than the second portion of the second mirror such that the first portion generates a first reflection having a different axial focus than a second reflection generated by the second portion, the first mirror configured to scan the beam of light across both the first portion and the second portion of the second mirror while the second mirror remains stationary to provide the different axial focus between the first reflection generated by the first portion and the second reflection generated by the second portion; and
   at least one device configured to capture one or more images of a sample using the reflections of the beam of light,
   wherein the objective is shifted off an optical axis to create a tilted focus that is incident normal to the tilted planar mirror of the second mirror.

2. The imaging system of claim 1,
   wherein,
   the first mirror is configured to scan the beam of light across the second mirror so the beam of light passes through the objective before reaching the second mirror.

3. The imaging system of claim 1, further comprising: another device configured to measure a focus of each of the reflections of the beam of light.

4. The imaging system of claim 1,
   wherein,
   the first mirror is configured to transmit the reflections of the beam of light to another objective, and
   the another objective is configured to illuminate the sample using the reflections of the beam of light.

5. The imaging system of claim 4,
   wherein,
   the at least one device is configured to capture the one or more images of the sample based on illumination of the sample using the reflections of the beam of light from the another objective.

6. A method comprising:
   generating, by a light source, a beam of light;
   scanning, by a first mirror, the beam of light across a second mirror;
   transmitting, via an objective, reflections of the beam of light generated by the second mirror to the first mirror, the reflections of the beam of light passing through the objective prior to returning to the first mirror, the second mirror including a tilted planar mirror having a unified structure including a first portion and a second portion, the first portion and the second portion each being planar; the first portion configured to reflect the beam of light at a different distance than the second portion of the second mirror such that the first portion generates a first reflection having a different axial focus than a second reflection generated by the second portion, the beam of light scanned by the first mirror by reflecting the beam of light across both the first portion and the second portion of the second mirror while the second mirror remains stationary to provide the different axial focus between the first reflection generated by the first portion and the second reflection generated by the second portion;
   capturing, by one or more devices, image data of a sample using the reflections of the beam of light; and
   generating, by the one or more devices, an image of the sample based on the image data,
   wherein the objective is shifted off an optical axis to create a tilted focus that is incident normal to the tilted planar mirror of the second mirror.

7. The method of claim 6, further comprising:
   providing, via the first mirror, the reflections of the beam of light to another objective, the another objective configured to illuminate the sample using the reflections of the beam of light.

8. The method of claim 7,
   wherein,
   the one or more devices are configured to capture the image data based on illumination of the sample using the reflections of the beam of light from the another objective.

9. The method of claim 6, further comprising:
   measuring, by a second device, a focus of each of the reflections of the beam of light.

10. An imaging system comprising:
    a light source configured to generate a beam of light;
    a first mirror configured to scan the beam of light across a second mirror so the beam of light passes through an objective and is reflected by the second mirror during the scan to yield reflections of the beam of light, the second mirror including a tilted planar mirror having a unified structure including a first portion and a second portion, the first portion and the second portion each being planar; the first portion configured to reflect the beam of light at a different distance than the second portion of the second mirror such that the first portion generates a first reflection having a different axial focus than a second reflection generated by the second portion, the first mirror configured to scan the beam of light by reflecting the beam of light across both the first portion and the second portion of the second mirror while the second mirror remains stationary to provide the different axial focus between the first reflection generated by the first portion and the second reflection generated by the second portion; and at least one device configured to capture one or more images of a sample using the reflections of the beam of light and measure a focus of each of the reflections of the beam of light, wherein the objective is shifted off an optical axis to create a tilted focus that is incident normal to the tilted planar mirror of the second mirror.

11. The imaging system of claim 10, wherein, the at least one device includes a first camera configured to capture the one or more images of the sample using the reflections of the beam of light, and the at least one device includes a second camera configured to measure the focus of each of the reflections of the beam of light.

* * * * *